United States Patent
Neukermans et al.

(10) Patent No.: US 6,229,139 B1
(45) Date of Patent: May 8, 2001

(54) HANDHELD DOCUMENT SCANNER

(75) Inventors: Armand P. Neukermans, Palo Alto; James P. Downing, Saratoga; Timothy G. Slater, San Francisco, all of CA (US)

(73) Assignee: Xros, Inc., Santa Clara, CA (US)

( * ) Notice: Subject to any disclaimer, the term of this patent is extended or adjusted under 35 U.S.C. 154(b) by 0 days.

(21) Appl. No.: 09/547,813

(22) Filed: Apr. 11, 2000

Related U.S. Application Data

(62) Division of application No. 09/121,439, filed on Jul. 23, 1998, now Pat. No. 6,064,779.

(51) Int. Cl.[7] .................................................. G01D 5/30
(52) U.S. Cl. ............................................ 250/236; 271/306
(58) Field of Search .................................. 250/234–236; 271/113, 184, 306, 3.23; 358/474, 493, 494

(56) References Cited

U.S. PATENT DOCUMENTS

| | | | |
|---|---|---|---|
| 4,762,994 | 8/1988 | Byerly et al. | 250/236 |
| 4,800,400 | 1/1989 | Douglas | 347/263 |
| 4,929,983 | * 5/1990 | Barton et al. | 271/307 |
| 4,947,262 | 8/1990 | Yajima et al. | 358/296 |
| 5,160,130 | * 11/1992 | Fromm et al. | 371/307 |
| 5,371,614 | 12/1994 | Ito | 358/488 |
| 5,402,252 | 3/1995 | Kojima | 358/474 |
| 5,488,862 | 2/1996 | Neukermans et al. | 73/504.02 |
| 5,543,956 | 8/1996 | Nakagawa et al. | 359/225 |
| 5,719,970 | 2/1998 | Aoki et al. | 382/313 |
| 5,915,689 | * 6/1999 | Everdyke et al. | 271/113 |

* cited by examiner

Primary Examiner—Stephone B. Allen
(74) Attorney, Agent, or Firm—D. E. Schreiber

(57) ABSTRACT

A document transport for a scanner (100) has a flexible, elongated finger (226) disposed adjacent to a document (134), and a force applied to the finger (226) urges teeth (233) on the finger (226) into contact with the document (134) which urges the document (134) along a path through the scanner (100). A piezoelectric plate (222), which applies the force to the finger (226), requires only a small amount of electrical power. To traverse the scanner (100), a document (134) may also be manually fed along a guide (272). First and second speed-sensing detectors (276a and 276b), disposed along the path traversed by the document (134), permit the scanner (100) to determine a speed at which the manually fed document (134) traverses the scanner (100). To conserve electrical energy, the scanner (100) also includes a document-presence detector (274) for activating the scanner (100) when a document (134) to be scanned is present.

5 Claims, 5 Drawing Sheets

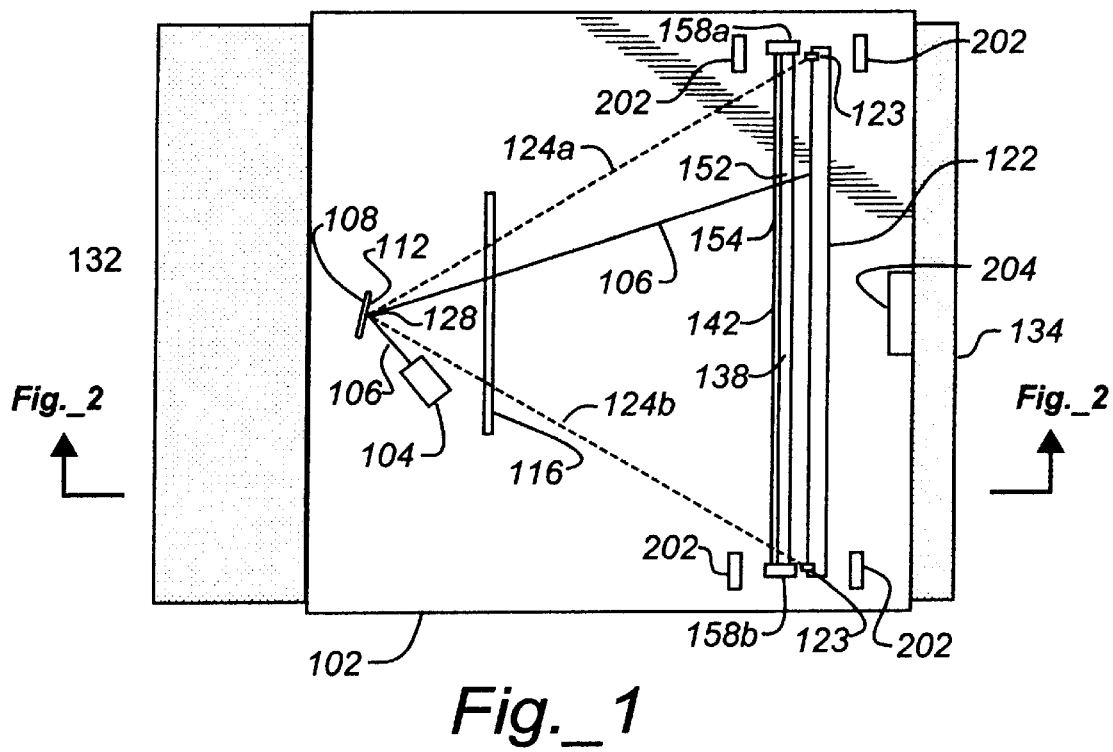
*Fig._1*
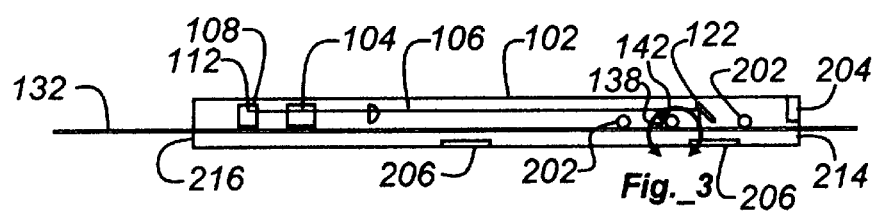
*Fig._2*
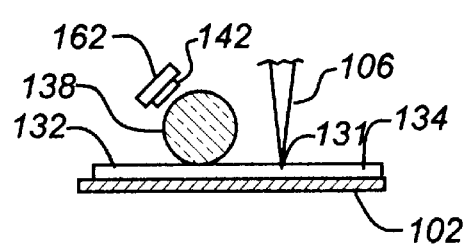
*Fig._3*

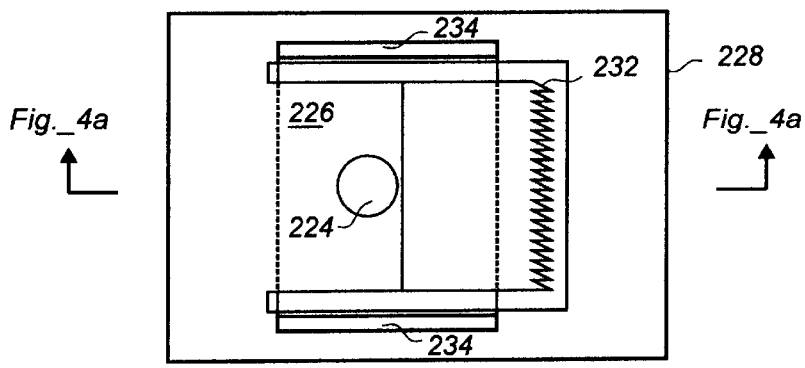
*Fig._4*
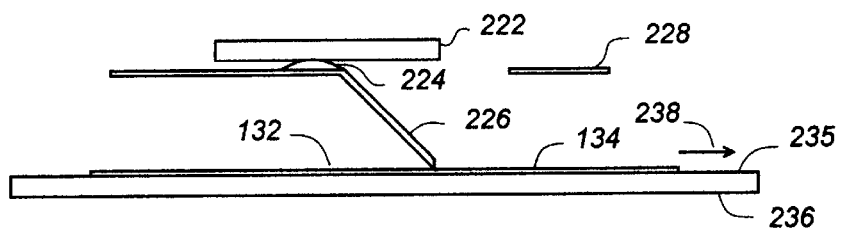
*Fig._4a*
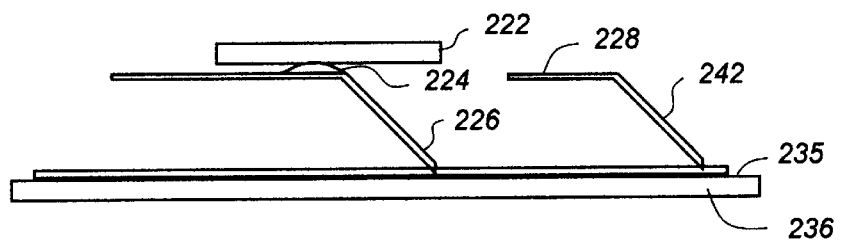
*Fig._4b*

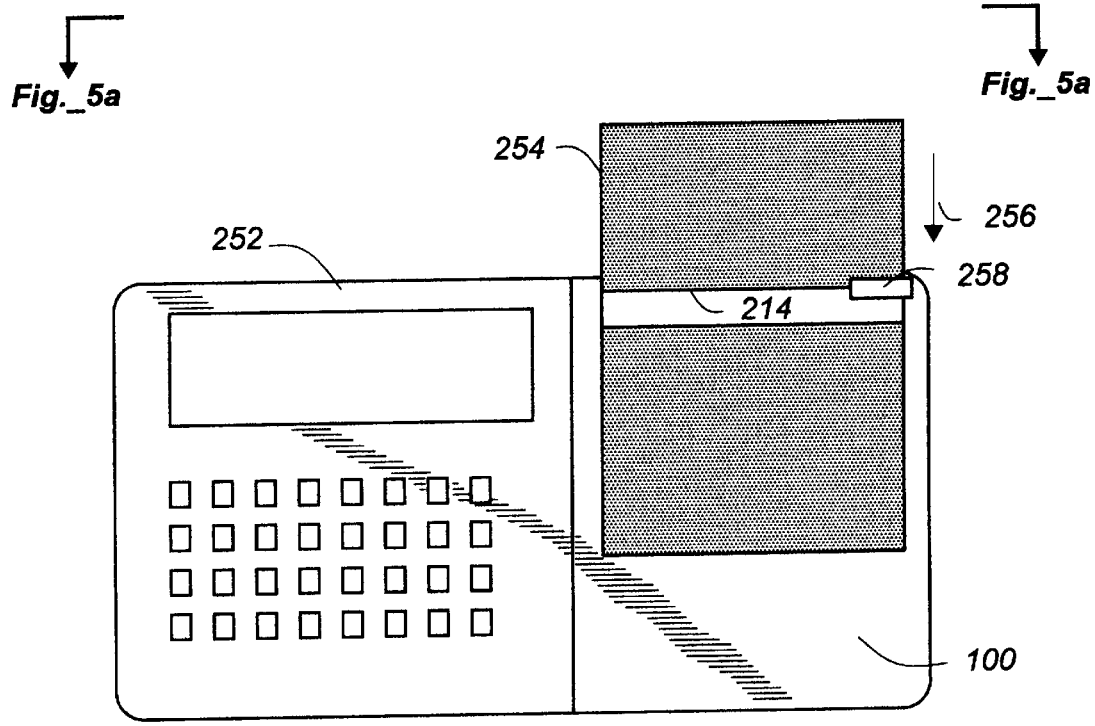
*Fig._5*
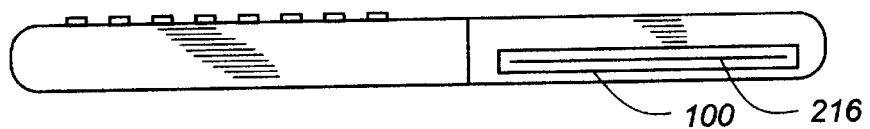
*Fig._5a*

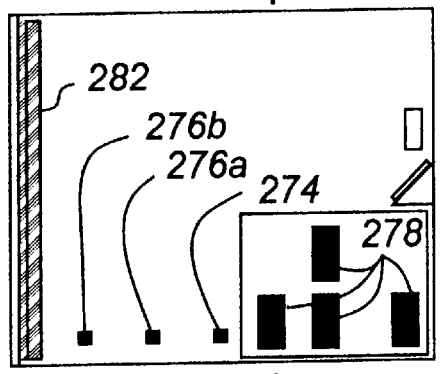
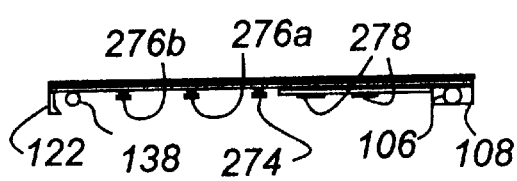
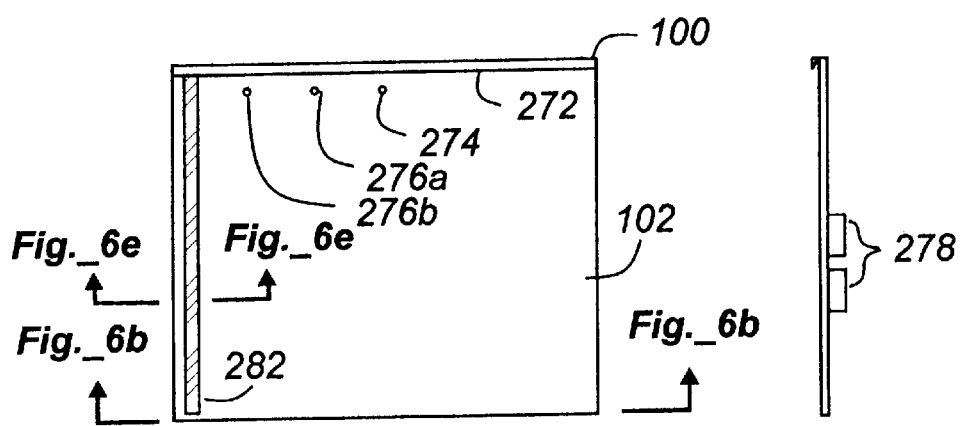

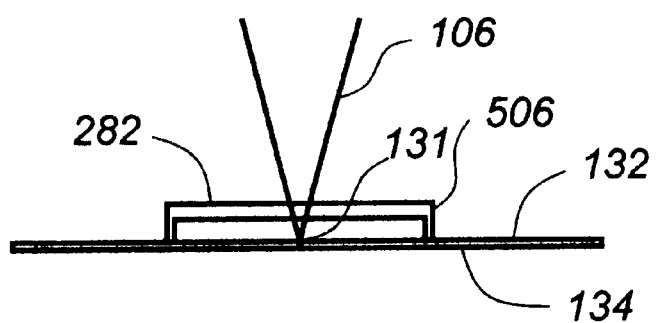
Fig._6e

HANDHELD DOCUMENT SCANNER

This is a division of application Ser. No. 09/121,439 filed Jul. 23, 1998, now U.S. Pat. No. 6,064,779.

BACKGROUND OF THE INVENTION

1. Field of the Invention

The present invention relates to the field of documents scanners and, more particularly but not exclusively to document scanners used with notebook and laptop computers and personal digital assistants (PDA's).

2. Description of the Prior Art

Historically, document scanners have been large, flatbed, desktop devices that occupy a footprint on a worksurface having an area which is larger than the largest document to be scanned, e.g. larger than 8½×11 inches. Smaller, sheet-fed document scanners have been developed in which during scanning a document travels along a U-shaped or curved path through the document scanner. Also document scanners have been developed in which a handheld wand is drawn across the surface of a document. All three of the preceding types of document scanners, i.e. flatbed scanners, curved path scanners, and wand scanners, have been connected by a signal and power cable usually to a desktop computer. Because a desktop working environment imposes essentially no limitation on how much electrical power the document scanner consumes, these types of document scanners generally do not use battery power.

Presently, PDA usage is expanding rapidly with various companies offering competing products. These PDAs are being used widely both for displaying information, and for capturing information in real-time. However, generally real-time capture of information using a PDA requires manual entry of data either using a miniaturized keyboard, or by cursive writing with a stylus on the PDA. Accordingly, incorporating a very small document scanner into a PDA, or attaching a document scanner to a PDA, would significantly enhance their usefulness for data entry. For example, small documents, such a business cards, could be scanned directly into the PDA. Similarly, rather than writing onto the PDA with a stylus, data being entered into the PDA could be simply printed or written onto a sheet of paper that is then scanned. The scanned image thus obtained may then be converted to digital data within the PDA using optical character recognition ("OCR") or intelligent character recognition ("ICR") techniques.

Present commercially available handheld document scanners generally use an optical diode array or a charge coupled device ("CCD") for converting an optical image into an electronic signal. A roller, gear and encoder mechanism is also included in the handheld document scanner to synchronize image data acquisition by the CCD with mechanical movement of the scanner across the document. Thus, if the document scanner provides 300 line-per-inch ("LPI") resolution, the encoder must generate 300 line-scanning pulses to capture 300 lines of image data for each inch of scanner movement. If the roller has a 1 inch circumference, then the gear train and encoder must be comparatively large and elaborate to generate the required 300 line-scanning pulses per roller revolution.

Another characteristic of such commercially available handheld document scanners is that they usually indicate on a display screen of the computer if scanner motion is too fast for image capture. The requirement that a user must watch the screen of the computer while drawing the handheld document scanner across a document tends to inhibit, to some degree, smooth scanner motion.

Also, many commercially available handheld document scanners lack an automatic exposure control. Using a CCD sensor, there exists an optimum scanning speed to ensure a proper exposure. If the scanner moves too slowly, the image will be over-exposed. If the scanner moves too fast, the image will be under-exposed. Thus, a document may have to be scanned several times using such a document scanner before obtaining a useful exposure. Repetitively scanning a document to obtain an acceptable image is very time consuming and frustrating.

One can readily obtain an appreciation for the technological challenge presented in capturing high quality images using a handheld scanner by considering imaging a three inch wide document at 400 dots-per-inch ("DPI"). If such a document is to be scanned at 3,000 lines per second using an oscillating flying spot scanner with all lines being scanned in the same direction, then each line must be scanned in approximately 166 microseconds. Since there are 1,200 dots in each scan line, the data for each dot, generally called a picture element ("pixel"), must be acquired in 138 nanoseconds, i.e. at approximately a 7.2 MHz pixel data rate. Capturing an image at this resolution and speed provides a high quality scanned image that is virtually free of motion fuzziness. Thus, if the motion of a handheld document scanner were irregular, the scanned image may be distorted by jerky scanner motion, but the image is not blurred. Such an operating capability is particularly important in scanning small type fonts, such as those used on business cards, so the image is not to be smeared.

In addition to severe technological constraints of small physical size, extremely high optical performance, and low electrical power consumption, there also a severe price constraint for document scanners to be used with PDAs. Since PDA's have now become a consumer item, prospective purchasers resist paying significantly more to add document scanning capability to their PDA. Consequently, a commercially practical document scanner used with a PDA must be priced commensurate with the PDA, while producing the high quality and high resolution images needed to capture small type fonts printed on business cards or other documents. In addition to being useful with PDAs, any document scanner that adequately solves the technological and commercial constraints imposed by PDAs would also be useful with notebook and laptop computers.

BRIEF DESCRIPTION OF THE INVENTION

An object of the present invention is to provide a document scanner having very thin geometry.

Another object of the present invention is to provide a document scanner that occupies a small volume.

Another object of the present invention is to provide a document scanner that requires a small amount of electrical power.

Another object of the present invention is to provide a document scanner that is adapted for use with PDA's, notebook computers, laptop computers and even desktop computers.

Another object of the present invention is to provide a document scanner that captures images at a very high speed.

Another object of the present invention is to provide a scanner which may be used in any environment.

Briefly, in one aspect the present invention is a transport for advancing a document along a path through a handheld scanner. The transport includes a platen having a surface adapted to receive and support the document. A flexible, elongated finger, also included in the transport, is disposed adjacent to the surface of the platen which receives the document. The finger does not contact a document received on the platen when no force is applied to the finger. The finger has a projecting end adapted to contact the document received on the platen when a force is applied to the finger that urges the finger toward the platen.

The transport also includes drive means for applying a force to the finger that urges the finger toward the platen. When the finger is urged toward the platen the projecting end of the finger contacts the document to thereby urge the document to move along the path through the scanner. In preferred embodiment of the drive means which requires a small amount of electrical power a plate of piezoelectric material is juxtaposed with the finger. Thus, by changing a voltage applied across the plate force is applied to the finger by the plate that urges the finger toward the platen.

In a second aspect the present invention is manually operable document scanner having a guide along which a document moves in traversing a path through the scanner. The manually operable document scanner also includes both a first speed-sensing detector and a second speed-sensing detector that are disposed along the path traversed by a document. The first and second speed-sensing detectors are disposed along the path so a leading edge of a document in traversing the path activates the first speed-sensing detector and then activates the second speed-sensing detector. The speed-sensing detectors permit the manually operable document scanner to determine a speed at which the manually fed document traverses the path.

In a preferred embodiment of the second aspect of the present invention the scanner also includes a document-presence detector for detecting a document to be scanned present on the scanner. The document-presence defector is activated by the presence of the document while the document traverses the path through the scanner before the document activates either the first or the second speed-sensing detectors. Detection of a document by the document-presence detector activates scanner operation.

In yet another preferred embodiment of the second aspect of the present invention the scanner also includes an optically transparent window through which a scanning-beam of light passes before impinging upon a document as the document traverses the path through the scanner. The window is preferably mounted in a housing that encloses and seals the scanner from environmental contamination, and is recessed within the housing to protect the window from scratching as the document traverses the path through the scanner.

Such handheld document scanners may be externally coupled to a PDA, or may be fully integrated within the PDA. In either form, the PDA can be used for storing scanned document images, for immediately sorting and classifying the images, and for later retrieval of the scanned images. Such scanned document images may later be downloaded to a desktop computer for additional data processing such as sorting, parsing of the data, OCR, ICR. and archival storage. In cases where a PDA, notebook or laptop computer includes a modem, scanned document images can be immediately transmitted to a network.

For mobile computing, a wand implementation of the handheld document scanner in accordance with the present invention may be connected to a notebook or laptop computer using the PC Card, flash memory card slot, or a flexible cable. Alternatively, the wand type handheld document scanner may be fully free-standing and either contain a local memory, or be coupled by radiation, e.g. radio or infra-red radiation to the PDA, notebook or laptop computer. A document scanner in accordance with the present invention provides the mobile user with very light weight, high speed, high resolution, low power document scanning capability in any environment.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a cross-sectional plan view illustrating a compact document scanner in accordance with the present invention;

FIG. 2 is a cross-sectional side elevational view illustrating a compact document scanner in accordance with the present invention taken along the line 2—2 in FIG. 2;

FIG. 3 is an enlarged cross-sectional side elevational view illustrating a compact document scanner in accordance with the present invention taken along the line 3—3 in FIG. 3; to FIG. 4 is a plan view illustrating a piezo-drive that may be used for advancing a document through the compact document scanner;

FIG. 4a is an elevational view of the piezo-drive view taken along a line 4a—4a in FIG. 4;

FIG. 4b is an elevational view of an alternative embodiment of the piezo-drive depicted in FIG. 4b.

FIG. 5 is a plan view of a digital personal organizer which incorporates a small document scanner in accordance with the present invention;

FIG. 5a is a front plan view of the digital personal organizer taken along the line 5a—5a in FIG. 11;

FIGS. 6a–6c are respectively plan and elevational views of document scanner used with a PDA that does not require a mechanical drive for document scanning;

FIG. 6d is a cross-sectional view illustrating integrated circuits included in the document scanner taken along a line 6d—6d in FIGS. 6a and 6c; and FIG. 6e is a cross-sectional view of a window included in a housing of the document scanner taken along a line 6e—6e in FIG. 6c.

DETAILED DESCRIPTION

FIG. 1 illustrates a compact document scanner in accordance with the present invention referred to by the general reference character 100. The document scanner 100 depicted in FIG. 1 is more thoroughly described in Patent Cooperation Treaty ("PCT") international patent application WO/23800 published Jul. 3, 1997, that is incorporated herein by reference ("the PCT published patent application"). The document scanner 100 includes a housing 102 that encloses a light source 104, preferably a laser diode together with optics for focusing a beam of light 106 emitted by the laser diode, or some other light source.

Also fixed within the housing 102 is a silicon micromachined torsional scanner 108 that includes a reciprocating mirror plate 112. The beam of light 106 preferably impinges directly upon the mirror plate 112 upon emission from the light source 104. The torsional scanner 108 is preferably constructed in accordance with the description set forth in U.S. Pat. No. 5,629,790 entitled "Micromachined Torsional Scanner" that issued May 13, 1997, on an application also filed by Armand P. Neukermans and Timothy G. Slater ("the '790 patent"). The '790 patent is hereby incorporated by reference as though fully set forth here. The optical reflectivity of the mirror plate 112 is preferably increased over that of the silicon material from which the torsional scanner 108 is fabricated by overcoating such silicon material with a highly reflective material such as aluminum ("Al"). In accordance with the description set forth in greater detail in U.S. Pat. No. 5,488,862 entitled "Monolithic Silicon Rate-Gyro with Integrated Sensors" that issued Feb. 6, 1996, on an application also filed by Armand P. Neukermans and Timothy G. Slater ("the '862 patent"), the torsional scanner 108 also includes a sensor (not separately depicted in FIG. 1) that is integrated into at least one of a pair of collinear torsion bars that support the mirror plate 112 within the torsional scanner 108. An electrical signal (if necessary suitably compensated for temperature variations) produced by the sensor integrated into the torsion bars encodes angular position of the mirror plate 112 with respect to the housing 102. The '862 patent is hereby incorporated by reference as though fully set forth here.

As described in greater detail in the '790 patent and in the '862 patent, within the torsional scanner 108 either an electrostatic and/or and electromagnetic force applied to the mirror plate 112 induces rotation of the mirror plate 112 with respect to the housing 102. In general, the mirror plate 112 may rotate as much as ±22.5° away from a rest position to which the mirror plate 112 returns in an absence of an applied electrostatic or electromagnetic force. Accordingly, during operation of the document scanner 100 the mirror plate 112 reciprocates back-and-forth on either side of its rest position responsive to either an applied electrostatic and/or and electromagnetic force. As explained in greater detail in the: '790 and '862 patents, such reciprocating motion of the mirror plate 112 may be driven either in a sinusoidal, self-oscillating mode at a frequency equal to the principal torsional vibrational mode of the mirror plate 112, or in a galvanometric mode at a much lower frequency. When operating in the galvanometric mode, reciprocation of the mirror plate 112 below some maximum frequency may be driven in almost any arbitrary manner. Specifically, the galvanometric mode permits the mirror plate 112 to reciprocate in either a saw-toothed or a triangular manner, both of which are well recognized in the art.

Upon reflection from the mirror plate 112, the beam of light 106 passes through an aspheric lens 116 that is preferably molded from plastic. The beam of light 106 after passing through the aspheric lens 116 impinges upon a turning mirror 122. Electrical signals produced by a pair of photo-diodes 123 located near opposite ends of the turning mirror 122 in FIG. 1 indicate the start and end of each successive scan of the beam of light 106 across the turning mirror 122. Thus, the electrical signals from the photo-diodes 123 provide references for the position of the beam of light 106 that are independent of the beam position as indicated by the sensor which is integrated into the torsion bars that support the mirror plate 112. During a time interval for a single reciprocation of the mirror plate 112, the mirror plate 112 deflects the beam of light 106 over a substantially planar, fan-shaped region bounded by the dashed lines 124a and 124b depicted in FIG. 1. Because the mirror plate 112 is, in general, extremely thin, e.g. 20–50 microns, and because the mirror plate 112 rotates about a common axis of the pair of collinear torsion bars that support the mirror plate 112 within the torsional scanner 108, the beam of light 106 in sweeping out the fan-shaped region bounded by the dashed lines 124a and 124b has a virtually fixed vertex 128 located on the mirror plate 112 of the torsional scanner 108.

As depicted in FIGS. 2 and 3, the turning mirror 122 redirects the beam of light 106 through an angle from the planar fan-shaped region through which the reciprocating mirror plate 112 sweeps the beam of light 106. In the instance of the document scanner 100, 90° deflection of the beam of light 106 causes it to impinge in a focused spot 131 on a surface 132 of a document 134. Impingement of the beam of light 106 in the focused spot 131 on the surface 132 of the document 134 scatters the beam of light 106 in various different directions. Some of the beam of light 106 scattered from the surface 132 passes through a light collecting cylindrical lens 138 which brings such scattered light into approximate focus on a detector 142. The angle through which the turning mirror 122 redirects the beam of light 106 is optimized for maximum light collection by the cylindrical lens 138 for focusing onto the detector 142.

The cylindrical lens 138 can be a simple glass or plastic rod having a diameter of 1 to several mm. The cylindrical lens 138 collects 35% to 40% of the light scattered by document 134, and directs such scattered light onto the detector 142. Scattering of the beam of light 106 as it scans across the surface 132 of the document 134 produces an amount of light at the detector 142 which varies depending upon absorption of the beam of light 106 by the surface 132. This varying amount of light impinging upon the detector 142 produces a proportionally varying photo-current in the detector 142 which is then amplified, digitized and processed by electronics connected to detector 142, that are well known in the art.

The focus of the beam of light 106 at the spot 131 is a short distance in front of cylindrical lens 138, and detector 142 is positioned to receive the greatest amount of light collected by the cylindrical lens 138. The location of the detector 142 is not critical, as long as most of the scattered light collected by the cylindrical lens 138 reaches the detector 142. With relatively little loss of light, the detector 142 can contact the cylindrical lens 138 so a separate mechanical support 162 for the detector 142 may not always be required.

FIG. 1, depicts an alternative structure for the detector 142 that employs an elongated translucent glass or plastic rod 152 instead of the cylindrical lens 138. The rod 152 has an overall length that equals or slightly exceeds the width of the document 134 along the path of the scanning beam of light 106. A long diffuse reflector stripe 154 contacts the back of rod 152 diametrically opposite the spot 131 of the beam of light 106. The alternative structure for the detector 142 employs two simple photo-diodes 158a and 158b located at opposite ends of the rod 152. In this alternative structure for detector 142, the reflector stripe 154 scatters light that enters the rod 152, and the rod 152 then channels the light scattered by the reflector stripe 154 to opposite ends of the rod 152 where it impinges upon the photo-diodes 158a and 158b. The output signals from the photo-diodes 158a and 158b can be summed and processed. One disadvantage of this alternative structure is that much less light impinges on the photo-diodes 158a and 158b than impinges upon the preferred detector 142. However, for short scan length of a few inches, this approach is adequate.

The arrangement of the light source 104, torsional scanner 108 aspheric lens 116 and turning mirror 122 provides a compact scanner for any medium, which, in the instance depicted in FIGS. 2–4, is the document 134. The light source 104, torsional scanner 108 aspheric lens 116 and turning mirror 122 focuses the beam of light 106 into the spot 131 that has an almost constant diameter across the entire width of the document 134. The beam of light 106, when brought to a focus on document 134, may typically have a diameter ranging between 50 to 150 microns that is almost constant over the entire scan width. For short scan distances, the aspheric lens 116 is not needed, and can be replaced by a simple constant focus lens.

Considering now the overall operation of the document scanner 100 to produce pixel data suitable for input to a PC, both the photo-current from the detector 142, which is generated as the beam of light 106 scans the surface 132, and the location of the beam of light 106 on the surface 132, as provided by an electrical signal from the sensor integrated into the torsion bars that support the mirror plate 112, can be encoded into pixel data concurrently by a conventional electronic circuit included in the document scanner 100 that is not depicted in any of the FIGS. Hence, torsional scanner 108 and the detector 142 provide all the data required to transmit pixel data to a PC. Signals produced by the photo-diodes 123 are correlated with the photo-current data from the detector 142 or photo-diodes 158a and 158b thereby providing a more precise registration between the photo-current data and a particular location on the surface 132.

The document 134 is inserted through a input slit 214 at the front of the housing 102, and exits through a exit slit 216 at the back. The document scanner 100 also includes a transport for moving the document 134 through the housing 102 that includes document feeder rolls and motor 202. A document detector 204 included in the document scanner 100 senses insertion of the document 134 into the housing 102 and immediately starts operation of the light source 104, torsional scanner 108, detector 142 and rolls and motor 202 as well as the electronic circuitry required for communicating and exchanging data with a PC. The document detector 204 may be optical, e.g. a light emitting diode ("LED")/photo transistor pair, mechanical, e.g. a micro-switch, or any other suitable device. The rolls and motor 202 keep the document 134 taut by driving it through the housing 102 with slightly different speeds. A preferred embodiment for the rolls and motor 202 are grit wheel rollers, containing sandpaper, as used in some digital computer plotting devices. A pair of electrostatic clamps 206, typically in the form of interdigitated fingers overcoated with a thin layer of low friction material such as Teflon® are located between the housing 102 and the document 134. Adjustment of an electrical potential applied to the electrostatic clamps 206 pulls the document 134 lightly against the bottom of housing 102 to hold the surface 132 of the document 134 in the focus plane of beam of light 106. Thus, the rolls and motor 202 and the electrostatic clamps 206 provide a medium transport for transporting the document 134 along a medium transport path through the housing 102.

As the document 134 moves through the housing 102 under the beam of light 106 driven by the rolls and motor 202, the document scanner 100 repetitively scans back-and-forth across the surface 132 while encoding the entire document 134. To coordinate movement of the document 134 through the housing 102 with movement of the beam of light 106 across the width of the document 134, the electrical signal produced by the sensor integrated into the torsion bars that support the mirror plate 112 is used as a clocking signal for advancing the document 134 with the rolls and motor 202, if need be equipped with an encoder.

All the optical components of the document scanner 100 illustrated in FIGS. 1–3, particularly the torsional scanner 108, are extremely small and inexpensive in comparison with conventional scanners. A printed circuit board, not depicted in any of the FIGS., is very thin and may be attached to the top of housing 102. The electronic components on the printed circuit board are very short, permitting the housing 102 to be extremely thin, as thin as 5.0 mm, or even less.

The document scanner 100 requires a transport for the document 134 that is very small and flat, inexpensive, and consumes little electrical energy. As depicted in FIG. 4 and 4a, a piezo-drive may be used for moving the document 134 through the document scanner 100. A bimorph or unimorph piezoelectric plate 222, that may be either rectangular as illustrated in FIG. 4 or disk-shaped, contacts a projecting dimple 224 formed into one surface of a bent, pawl-like, metallic finger 226.

The plate 222 may be formed from a stress-biased PLZT material such as one of the materials manufactured by Aura Ceramics and sold under the "Rainbow" or "Thunder" product designation. The plate 222 may be 5.0 mm to 1.0 cm on a side, and 250 to 400 microns thick to obtain a deflection of approximately 100 micron. Though not illustrated in any of the FIGS., two plates 222 may be stacked face-to-face to increase deflection for the same applied voltage.

The finger 226 is typically made from stainless steel and is 1.0 to a few mils thick. The finger 226 is fabricating by first etching a pattern into a sheet of stainless steel. The finger 226, supported from a surrounding frame 228, is then mechanically punched from the etched sheet to provide the shape illustrated in FIGS. 4 and 4a. The outline of the plate 222 etched into the stainless steel sheet preferably includes a row of teeth 232 at a distal end of the finger 226 as illustrated, or any arrangement of relatively sharp points. The dimple 224 contacts the center of the plate 222, where the excursion of the plate 222 is maximum upon application of a voltage thereacross. Spacers 234 separate and attach the frame 228 carrying the finger 226 to the plate 222.

Upon applying an appropriate voltage across the plate 222, the plate 222 deflects downward pushing the finger 226 downward into contact with the surface 132 of the document 134. Upon contacting the surface 132, the teeth 232 engage the document 134 supported on a surface 235 of a platen 236 urging the document 134 a controlled distance in a direction indicated by an arrow 238 in FIG. 4a. Upon reversing the voltage applied across the plate 222, the plate 222 deflects raising upward the teeth 232 of the finger 226 thereby disengaging from the document 134.

Providing a second pawl 242 that extends from the frame 228 as illustrated in FIG. 4b further resists reverse movement of the document 134. In the embodiment depicted in FIG. 4b, the teeth 232 of the finger 226 advance the document 134 as described above while the pawl 242 resists the document 134 being drawn backward through the document scanner 100.

Retraction and engagement of the teeth 232 with the surface 132 may be done at differing rates, e.g. one being very fast, the other being relatively slow. For example, retraction may be faster than engagement, to avoid pulling the document 134 backward through the document scanner 100. The electrical signal applied across the plate 222 may be bipolar so the plate 222 always returns to the same position at the end of each cycle, and no hysteresis occurs.

Controlled deflection of the plate 222 permits moving the document 134 with very little power and very inexpensively. Since the document 134 moves relatively slowly through the document scanner 100, approximately 1.0 inch per second, the plate 222 combined with the finger 226 can produce such motion. A displacement of the plate 222 of 50–100 micron per stroke combined with a stroke repetition rate of approximately 500 to 250 times a second moves the document 134 past the spot 131 at approximately 25 mm/sec. For use in the document scanner 100, the stroke of the plate 222 is advantageously synchronized to sweeping of the beam of light 106, and the deflection amplitude of the plate 222 adjusted by the voltage applied thereacross to produce the desired movement of the document 134.

Two or more such mechanisms arranged side-by-side across the document 134 may be used to produce parallel motion of the document 134. The finger 226 or even just the teeth 232 may be angled slightly away from each other to apply a controlled tension across the document 134 and keep it tight.

The size of the document scanner 100 is proportional to the size of the document 134 to be scanned. FIGS. 5 and 5A illustrate integrating the document scanner 100 along one side of a PDA 252 to scan an approximately 2¼×3½ inch business card 254. The business card 254 may be inserted slowly, manually if so desired, as indicated by an arrow 256. A roller 258 that contacts the business card 254 and is coupled to a very small optical encoder (or any inexpensive small angular encoder), not separately illustrated in any of the FIGS. Rotation of the roller 258 as the document 134 moves through the document scanner 100 encodes how far the document 134 has traveled through the document scanner 100. The document scanner 100 may be attached to the side of the PDA 252 as illustrated, or alternatively may be attached to the front or the back of a PDA a notebook, or a laptop PC.

The document scanner 100 may be further simplified by moving the document 134 by hand, using a steady motion, in "ballistic" manner. It is possible, with some practice, for a user to move the document 134, such as a business card, manually past the spot 131 at a rate which is approximately a desired scanning speed. It is helpful to understand that conventional OCR and ICR processes generally accommodate some amount of character distortion, at least in one direction, particularly if the amount of distortion is specified. Eliminating the document transport allows a further reduction the size and cost of the document scanner 100, and allows the document scanner 100 to be integrated in an extremely small and cost effective form in the surface of a PDA, notebook, or laptop computer.

FIGS. 6a–6d illustrate such an implementation of the document scanner 100 which employs a ballistic operating mode. Thus, the document scanner 100 illustrated in FIGS. 6a–6d, omits a document transport mechanism. The scanning motion is simply provided by a user, who slides the document 134 along the side of a small guide 272 at approximately constant speed. The document scanner 100 as adapted for ballistic operation can include a display which permits verifying a proper scanning speed for the document 134.

In operating the document scanner 100 depicted in FIGS. 6a–6d, the document 134 is initially placed over a document-presence detector 274. To conserve electrical energy, the document scanner 100 depicted in FIGS. 6a–6d, except for the document-presence detector 274, is normally turned off. Upon placing the document 134 on the document-presence detector 274, the document scanner 100 turns on and activates operation of appropriate character recognition software included in the document scanner 100, or in the PDA 252. The user then pauses for a moment to permit scanning of the beam of light 106 to reach full amplitude. The document scanner 100 depicted in FIGS. 6a–6d may include a display that indicates when the beam of light 106 reaches full scanning amplitude.

After the document scanner 100 begins operating, the user then slides the document 134 at constant speed along the guide 272. The speed of the document 134 is determined by a pair of photo-detectors 276a and 276b integrated into the housing 102 of the document scanner 100. The photo-detectors 276a and 276b are spaced a fixed distance apart. Thus, a computer program executed by integrated circuits ("ICs") 278 incorporated into the document scanner 100 determines an initial speed at which the document 134 moves along the guide 272 from a time interval between signals transmitted by the photo-detectors 276a and 276b as a leading edge of the document 134 progressively occludes them. In the same way, the speed at which the document 134 moves along the guide 272 may be determined for a second time when a trailing edge of the document scanner 100 passes over the photo-detectors 276a and 276b. If the speed at which the document 134 moves along the guide 272 is too fast or too slow, or varies too much, an indicator (such as a buzzer, LED indicator, or a display on the PDA, notebook, or laptop computer's screen) prompts the user to try again. The speed at which the document 134 moves past the spot 131 determined by signals from the photo-detectors 276a and 276b can be used for scaling image data to assist in OCR or ICR.

Note that it is possible to completely seal the housing 102 of the scanner 100 illustrated in FIGS. 6a–6d. Incorporating a small optically transparent window 282 of glass or plastic into the housing 102 near the spot 131 where the beam of light 106 comes to a focus, as illustrated in FIG. 6e, seals the housing. To prevent scratching, the window 282 is made from any hard transparent material, and is recessed within the housing 102 as depicted in FIG. 6e so the window 282 does not contact the document 134. The window 282 may be longer than the width of a regular business card, e.g. the width of a typical news paper column, so the document scanner 100 may be used for scanning notes and other documents in regular script for later transfer to a computer. The optical design of the document scanner 100 may be adjusted to compensate for the optical thickness of the window 282 since, in general, the optical thickness of the window 282 is a minor consideration. This way, the beam of light 106 comes to a focus on the spot 131 of the document 134 just beyond the window 282, and the housing 102 of the document scanner 100 is entirely sealed from the outside against possible dirt and contamination. Operation of the other components included in the document scanner 100 depicted in FIGS. 6a–6d is the same as that described in the published PCT Patent Application. The document scanner 100 depicted in FIGS. 6a–6d may be incorporated directly into the housing 102 of PDA 252, or of a notebook or laptop computer.

INDUSTRIAL APPLICABILITY

For the document scanner 100, the torsional scanner 108 is free running, and the exposure of the document 134 to the beam of light 106 is virtually independent of the speed that the document 134 passes manually through the document scanner 100 since the lateral scan speed is extremely high, approximately 1000 m/sec. If the document 134 moves through the document scanner 100 too slowly, the scanned image becomes elongated in the scan direction but is not over exposed. Likewise, if the document 134 moves through the document scanner 100 too quickly, the scanned image becomes compressed in the scan direction.

The document scanner 100 inherently provides very good contrast, and therefore can accommodate a very large range of document contrast. However, if necessary, the document scanner 100 can permit a user to quickly pre-scan the document 134 at any speed to set an illumination level for the document scanner 100, or contrast and gain of the document scanner 100, to improve scanned image quality. Since the dwell time of the beam of light 106 on each pixel is only a small fraction of a microsecond, with a scanning velocity for the spot 131 of approximately 1000 m/sec, mechanical motion transverse to the scanning direction is immaterial to light collected during the pixel sampling interval. The user can therefore make a correct pre-scan at any desired speed, as swiftly as desired. Operation of the document scanner 100 can be arranged so the last image data gathered by the document scanner 100 provides a default for a subsequent scan of the document 134.

For much of the information of interest to a user of the document scanner 100, the content of the message is the prime motivation for scanning the document 134. Nevertheless, it is still highly desirable to have a pleasing scanned image where all characters are correctly formed and hence have the right aspect ratio. If the ballistic operating mode stretches some of the characters somewhat, it changes the overall message imperceptibly unless the deformation is extreme. Even such deformed characters can usually still be converted by exiting OCR and ICR computer programs.

In most instances, with a minimum of training a user can scan text at approximately the right speed, such that the characters will be visually recognized correctly. And as stated previously, even when characters are deformed, they usually can still be recognized using OCR or ICR because such computer programs deal with a vast number of different fonts of different character aspect ratios.

Although the present invention has been described in terms of the presently preferred embodiment, it is to be understood that such disclosure is purely illustrative and is not to be interpreted as limiting. Thus, although the piezoelectric plate 222 is prefered for the document transport, an electromagnetic drive may also be used for applying a force to the finger 226. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A transport for advancing a document along a path through a scanner, the transport comprising:

a platen having a surface adapted to receive and support the document;

a flexible, elongated finger disposed adjacent to the surface of said platen which receives the document, said finger not contacting a document received on said platen when no force is applied to said finger, said finger having a projecting end adapted to contact the document received on said platen when a force is applied to said finger that urges said finger toward said platen; and drive means for applying a force to said finger urging said finger toward said platen, whereby the projecting end of said finger contacts the document thereby urging the document to move along the path through the scanner.

2. The transport of claim 1 wherein the projecting end of said finger has teeth formed thereon that contact the document.

3. The transport of claim 2 wherein the teeth lightly contact the document when no force is applied to said finger.

4. The transport of claim 1 wherein said drive means includes a plate of piezoelectric material that is juxtaposed with said finger whereby upon changing a voltage applied across the plate force is applied to said finger by the plate that urges said finger toward said platen.

5. The transport of claim 1 further comprising a pawl disposed adjacent to the surface of said platen which receives the document, a projecting end of said pawl contacting a document received upon the platen to impede movement of the document along the path through the scanner in a direction opposite to that in which contact between the projecting end of said finger and the document urges the document to move along the path through the scanner.

\* \* \* \* \*